United States Patent
Matsuda et al.

(10) Patent No.: US 10,629,185 B2
(45) Date of Patent: Apr. 21, 2020

(54) STATISTICAL ACOUSTIC MODEL ADAPTATION METHOD, ACOUSTIC MODEL LEARNING METHOD SUITABLE FOR STATISTICAL ACOUSTIC MODEL ADAPTATION, STORAGE MEDIUM STORING PARAMETERS FOR BUILDING DEEP NEURAL NETWORK, AND COMPUTER PROGRAM FOR ADAPTING STATISTICAL ACOUSTIC MODEL

(71) Applicant: National Institute of Information and Communications Technology, Tokyo (JP)

(72) Inventors: Shigeki Matsuda, Tokyo (JP); Xugang Lu, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 1003 days.

(21) Appl. No.: 15/031,449

(22) PCT Filed: Nov. 6, 2014

(86) PCT No.: PCT/JP2014/079490
§ 371 (c)(1),
(2) Date: Apr. 22, 2016

(87) PCT Pub. No.: WO2015/079885
PCT Pub. Date: Jun. 4, 2015

(65) Prior Publication Data
US 2016/0260428 A1    Sep. 8, 2016

(30) Foreign Application Priority Data
Nov. 27, 2013  (JP) ................................ 2013-245098

(51) Int. Cl.
*G06N 3/08* (2006.01)
*G10L 15/16* (2006.01)
(Continued)

(52) U.S. Cl.
CPC ............. *G10L 15/16* (2013.01); *G06N 3/04* (2013.01); *G06N 3/0454* (2013.01); *G06N 3/08* (2013.01);
(Continued)

(58) Field of Classification Search
CPC ........ G06N 3/0454; G06N 3/08; G06N 3/084; G06N 3/04; G06N 3/02; G10L 15/14;
(Continued)

(56) References Cited

U.S. PATENT DOCUMENTS 5,317,673 A    5/1994  Cohen et al.
2015/0127336 A1*  5/2015  Lei ......................... G10L 17/18
                                                              704/232

FOREIGN PATENT DOCUMENTS

JP    2008-216488 A    9/2008
WO   WO 94/00837 A1    1/1994

OTHER PUBLICATIONS

Gehring et al ("Extracting Deep Bottleneck Features Using Stacked Auto-Encoders" May 2013) (Year: 2013).*
(Continued)

*Primary Examiner* — Lut Wong
(74) *Attorney, Agent, or Firm* — Renner, Otto, Boisselle & Sklar, LLP

(57) ABSTRACT

[Object] An object is to provide a statistical acoustic model adaptation method capable of efficient adaptation of an acoustic model using DNN with training data under a specific condition and achieving higher accuracy. [Solution] A method of speaker adaptation of an acoustic model using DNN includes the steps of: storing speech data 90 to 98 of
(Continued)

different speakers separately in a first storage device; preparing speaker-by-speaker hidden layer modules 112 to 120; performing preliminary learning of all layers 42, 44, 110, 48, 50, 52 and 54 of a DNN 80 by switching and selecting the speech data 90 to 98 while dynamically replacing a specific layer 110 with hidden layer modules 112 to 120 corresponding to the selected speech data; replacing the specific layer 110 of the DNN that has completed the preliminary learning with an initial hidden layer; and training the DNN with speech data of a specific speaker while fixing parameters of layers other than the initial hidden layer.

5 Claims, 6 Drawing Sheets

(51) Int. Cl.
  *G06N 3/04* (2006.01)
  *G10L 15/07* (2013.01)
  *G10L 15/06* (2013.01)

(52) U.S. Cl.
  CPC ............ *G06N 3/082* (2013.01); *G10L 15/075* (2013.01); *G10L 15/063* (2013.01)

(58) Field of Classification Search
  CPC ..... G10L 13/08; G10L 15/1807; G10L 25/30; G10L 25/90
  USPC .......................................................... 706/28
  See application file for complete search history.

(56) References Cited

OTHER PUBLICATIONS

European Search Report dated Sep. 4, 2017 for corresponding Application No. 14866448.5.

Gemello R et al. "Linear input network based speaker adaptation in the Dialogos system", 1998 IEEE International Joint Conference on Neural Networks Proceedings. IEEE World Congress on Computational Intelligence, Anchorage, AK, USA, vol. 3, May 4, 1998, pp. 2190-2195.

Anastasakos T et al. "Speaker adaptive training: a maximum likelihood approach to speaker normalization", IEEE International Conference on Acoustics, Speech, and Signal Processing, 1997. ICASSP-97, Munich, Germany, vol. 2, Apr. 21, 1997, pp. 1043-1046.

International Search report for corresponding International Application No. PCT/JP2014/079490 dated Feb. 10, 2015.

Y. Bengio, "Learning Deep Architectures for AI," Foundations and Trends in Machine Learning, vol. 2, No. 1, pp. 1-127, 2009. (cited in the specification).

G. Hinton, L. Deng, D. Yu, G. Dahl, A. Mohamed, N. Jaitly, A. Senior, V. Vanhoucke, P. Nguyen, T. Sainath, and B. Kingsbury, "Deep Neural Networks for Acoustic Modeling in Speech Recognition: The Shared Views of Four Research Groups," IEEE Signal Processing Magazine, vol. 29, No. 6, pp. 82-97, 2012. (cited in the specification).

A. Mohamed, G. Dahl, and G. Hinton, "Acoustic Modeling using Deep Belief Networks," IEEE Transactions on Audio, Speech, and Language Processing, vol. 20, No. 1, pp. 14-22, 2012. (cited in the specification).

Quoc V. Le, Marc'Aurelio Ranzato, Rajat Monga, Matthieu Devin, Kai Chen, Greg S. Corrado, Jeff Dean, Andrew Y. Ng, "Building High-level Features Using Large Scale Unsupervised Learning," Proc. ICML, 2012. (cited in the specification).

H. Liao, "Speaker Adaptation of Context Dependent Deep Neural Networks," in Proc. ICASSP, 2013, pp. 7947-7951. (cited in the specification).

Frank Seide, Gang Li, Xie Chen, and Dong Yu, "Feature Engineering in Context-Dependent Deep Neural Networks for Conversational Speech Transcription," 2011 IEEE Workshop on Automatic Speech Recognition and Understanding (ASRU), Dec. 11, 2011, p. 24-29.

George E. Dahl, Dong Yu, Li Deng, and Alex Acero, "Context-Dependent Pre-Trained Deep Neural Networks for Large-Vocabulary Speech Recognition," IEEE Transactions on Audio, Speech, and Language Processing, Jan. 2012, vol. 20, No. 1, Jan. 2012, p. 30-42.

D. Yu, K. Yao, H. Su, G. Li, and F. Seide, "KL-Divergence Regularized Deep Neural Network Adaptation for Improved Large Vocabulary Speech Recognition," in Proc. ICASSP, 2013.

Ossama Abdel-Hamid, and Hui Jiang, "Fast Speaker Adaptation of Hybrid NN/HMM Model for Speech Recognition Based on Discriminative Learning of Speaker Code", 2013 IEEE ICASSP, May 26, 2013, pp. 7942-7946.

\* cited by examiner

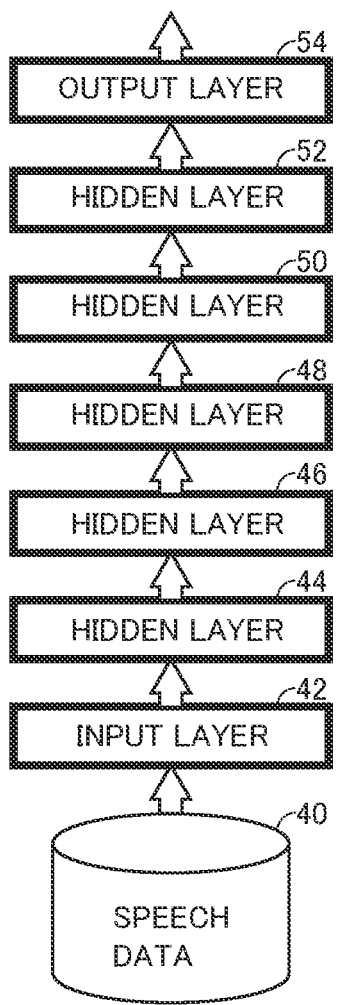
Fig. 1
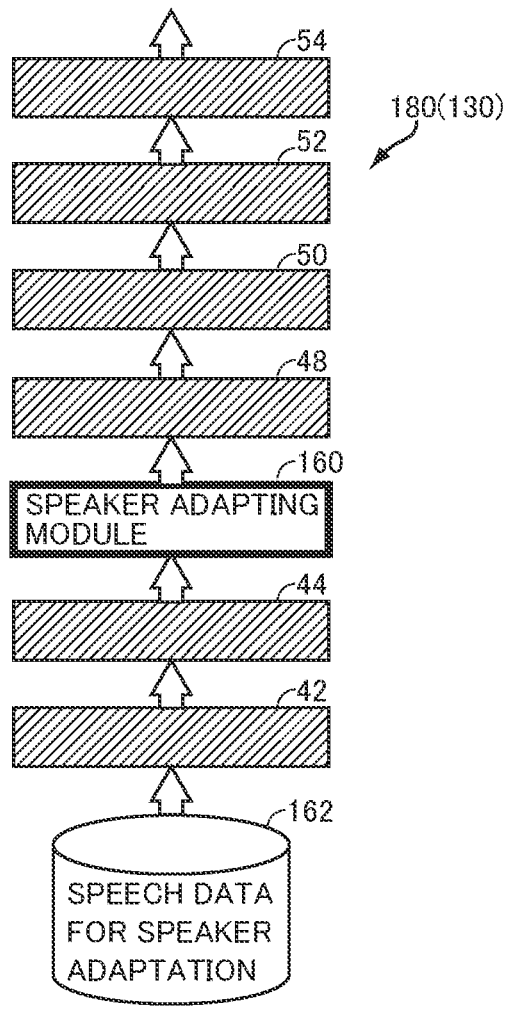
Fig. 5
Fig. 7
| POSITION OF ADAPTING LAYER | SI-DNN | SA-DNN | SAT-DNN |
|---|---|---|---|
| 1 | 26.4% | 20.0% | 18.9% |
| 2 | 26.4% | 19.0% | 18.2% |
| 3 | 26.4% | 18.7% | 18.0% |
| 4 | 26.4% | 19.0% | 18.4% |
| 5 | 26.4% | 19.5% | 19.0% |

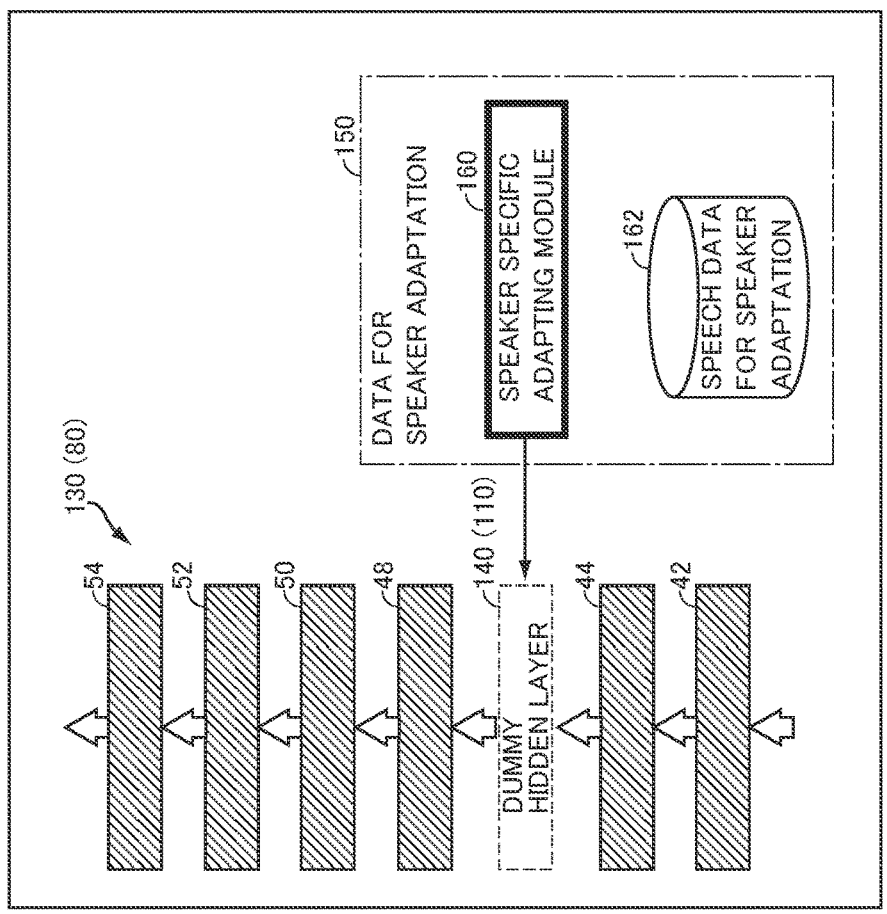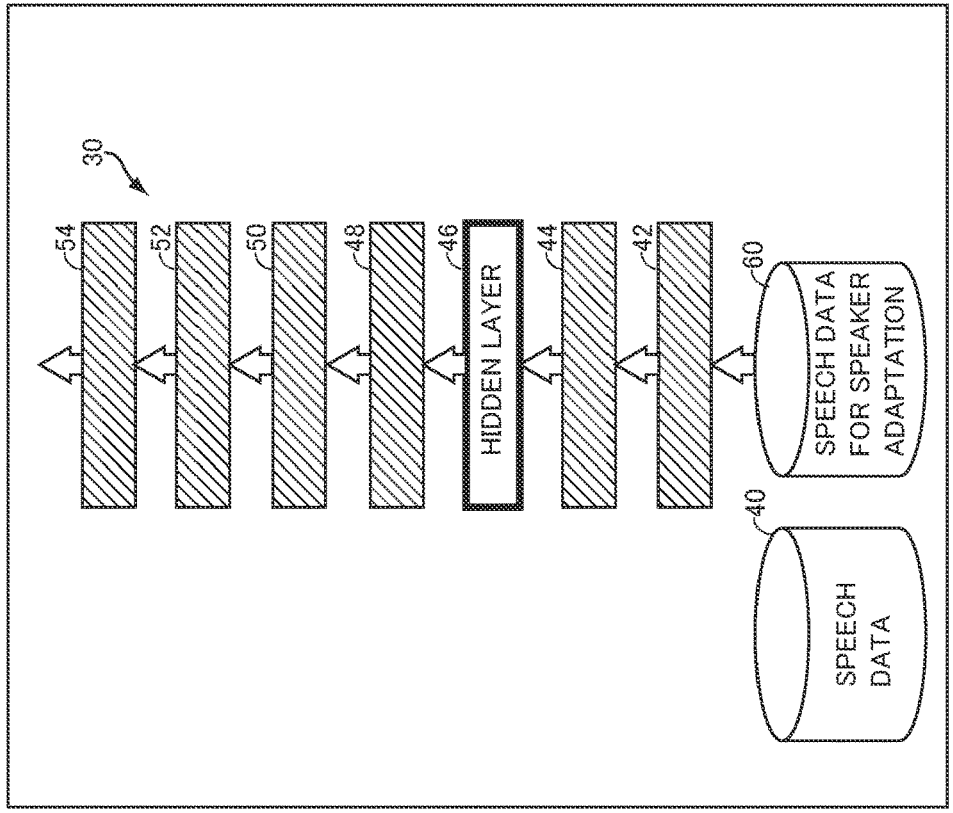

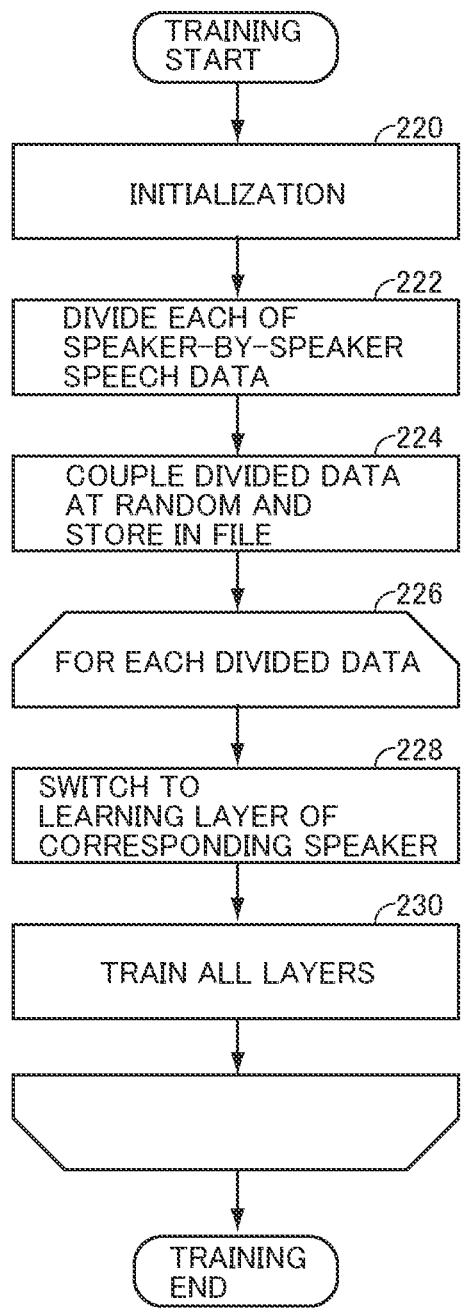

STATISTICAL ACOUSTIC MODEL ADAPTATION METHOD, ACOUSTIC MODEL LEARNING METHOD SUITABLE FOR STATISTICAL ACOUSTIC MODEL ADAPTATION, STORAGE MEDIUM STORING PARAMETERS FOR BUILDING DEEP NEURAL NETWORK, AND COMPUTER PROGRAM FOR ADAPTING STATISTICAL ACOUSTIC MODEL

TECHNICAL FIELD

The present invention relates to Deep Neural Network (hereinafter referred to as "DNN" for simplicity of description) used for recognition techniques such as speech recognition and, more specifically, to a technique for improving learning efficiency of DNN for a specific object.

BACKGROUND ART

DNNs are attracting attention as a method of machine learning. DNNs have been applied to image recognition, speech recognition and so forth, and their superior performances over conventional approaches have been reported, where an error rate, for example, is improved by about 20 to 30% (Non-Patent Literatures 1-3).

We can consider a DNN to be a neural network having layers larger in number than before. Specifically, a DNN includes an input layer, an output layer, and a plurality of hidden layers provided between the input and output layers. The input layer has a plurality of input nodes (neurons). The output layer has neurons the number of which corresponds to the number of objects to be identified. Hidden layers each have a plurality of neurons. Pieces of information propagate from the input layer to the hidden layers one by one and eventually outputs are provided at output nodes. Because of this scheme, the number of nodes included in the output layer tends to be larger than in other layers.

In a DNN, the number of layers is large and the number of neurons in each layer is also large. Therefore, the amount of computation for learning could be enormous. Previously, such computation has been almost impossible. Nowadays, computers have higher computing capabilities, and distributed/parallel processing techniques and computational theory are so developed as to allow DNN learning. When a huge amount of data is to be used for training, however, it still takes a long time for learning. By way of example, in an experiment described in Non-Patent Literature 4, a DNN learning using 10 million images of 200×200 pixels as training data took three days by 1,000 machines of 16 cores.

CITATION LIST

Non Patent Literature

NPL 1: Y. Bengio, "Learning deep architectures for AI," Foundations and Trends in Machine Learning, Vol. 2, No. 1, pp. 1-127, 2009.

NPL 2: G. Hinton, L. Deng, D. Yu, G. Dahl, A. Mohamed, N. Jaitly, A. Senior, V. Vanhoucke, P. Nguyen, T. Sainath, and B. Kingsbury, "Deep Neural Networks for Acoustic Modeling in Speech Recognition: The Shared Views of Four Research Groups," IEEE Signal Processing Magazine, Vol. 29, No. 6, pp. 82-97, 2012.

NPL 3: A. Mohamed, G. Dahl, and G. Hinton, "Acoustic Modeling using Deep Belief Networks," IEEE Transactions on Audio, Speech, and Language Processing, Vol. 20, No. 1, pp. 14-22, 2012.

NPL 4: Quoc V. Le, Marc'Aurelio Ranzato, Rajat Monga, Matthieu Devin, Kai Chen, Greg S. Corrado, Jeff Dean Andrew Y. Ng, "Building High-level Features Using Large Scale Unsupervised Learning," Proc. ICML, 2012.

NPL 5: H. Liao, "Speaker adaptation of context dependent deep neural networks," in Proc. ICASSP, 2013, pp. 7947-7951.

SUMMARY OF INVENTION

Technical Problem

By way of example, in speech recognition, machine learning of an acoustic model is conducted using speech data with phoneme labels. Further, a language model is prepared by keeping statistics of frequency of appearance of words or word sequences in a corpus beforehand. An input speech is subjected to statistical speech recognition using the acoustic model and the language model, and a character sequence having a high likelihood of generating the input speech is output as a result of recognition.

Speech characteristics differ as the sex and age of speakers differ. Therefore, by preparing separate acoustic models for speakers of different sex and age, higher accuracy can be attained. For this purpose, a huge amount of speech data of speakers of the same sex and similar age is utilized for learning of each acoustic model. On the other hand, if the speaker as an object of recognition is known to be a specific person, theoretically, accuracy of speech recognition for the speaker would be higher if an acoustic model is learned using only the speech data of the speaker. It is difficult, however, to collect a huge amount of speech data of a specific speaker. Statistical speech recognition requires an enormous amount of speech data for learning and, therefore, it is difficult to realize learning for a specific speaker.

To solve this problem, in a conventional speech recognition technique using an acoustic model based on HMM (Hidden Markov Model), a method of speaker adaptation referred to as SAT (Speaker Adaptive Training) has been successfully applied. A standard HMM adopts GMM (Gaussian Mixture Model) for estimating the emission probability at every state of the HMM structure. SAT is a training scheme that normalizes speaker-dependent acoustic variability in speech signals and optimizes recognizing parameters including GMMs to realize speaker-adaptation of the acoustic models and to achieve high recognition accuracy. HMM of this type is referred to as SAT-HMM.

Recently, an HMM speech recognizer that uses a DNN in place of GMM for speaker-independent speech recognition has been proposed. HMM speech recognition using DNN in place of GMM will be hereinafter referred to as "DNN-HMM." Since DNN is known to have high discriminative power, DNN-HMM is expected to achieve higher recognition accuracy.

Non-Patent Literature 5 shows an example of speaker adaptation using such a DNN. Referring to FIG. 1, when speaker adaptation is to be realized thorough the method of speaker adaptation described in Non-Patent Literature 5, an initialized DNN 30 for an acoustic model and speech data 40 consisting of speeches of a specific speaker are prepared. It is assumed that DNN 30 includes an input layer 42, an output layer 54 and hidden layers 44, 46, 48, 50 and 52. DNN 30 as a whole is trained with speech data 40 prepared in this manner, and a speaker-adapted DNN 30 is obtained.

It is difficult, however, to obtain sufficient amount of training data to obtain highly accurate results of speech recognition from only the speech data of a specific speaker.

Here, the idea of SAT-HMM described above may be applicable to DNN-HMM. Specifically, first, DNN 30 is trained using speaker-independent speech data 40 consisting of speech data of a large number of speakers, to prepare a speaker-independent acoustic model. Thereafter, as shown in FIG. 2, speech data 60 for speaker adaptation of a specific speaker is prepared, in place of the speaker-independent speech data 40. Further, in DNN 30, a hidden layer for speaker adaptation is determined (for example, hidden layer 46). Parameters of layers other than this hidden layer are all fixed while DNN 30 is trained using the speech data 60. As a result, hidden layer 46 is adapted by the speech data 60 of the specific speaker. By using DNN 30 trained in this manner in place of the GMM in the conventional HMM, an acoustic model adapted to a specific speaker can be obtained.

It is noted that in this scheme, layers other than the hidden layer 46 have parameters fixed as at the time of speaker-independent training. Therefore, in speaker adaptation, it becomes necessary to absorb differences in acoustic characteristics from different speakers solely by hidden layer 46. For this purpose, again, sufficient amount of speech data of the specific speaker is necessary to realize highly accurate DNN learning. In other words, it is difficult to efficiently improve accuracy of speech recognition if the conventional technique of SAT-HMM is simply applied to DNN.

Such a problem arises not only in acoustic model adaptation for speech recognition under the condition of specific speaker. For example, assuming that speech recognition is to be done under a specific noise environment, this problem arises when an acoustic model is to be adapted to the noise environment. Further, this problem also arises when an acoustic model is to be trained for speech recognition of a certain group sharing prescribed voice characteristics.

Therefore, an object of the present invention is to provide a statistical acoustic model adaptation method and an acoustic model learning method suitable for the statistical acoustic model adaptation, capable of efficient adaptation and achieving higher accuracy, when an acoustic model using DNN is to be adapted using training data obtained under specific conditions.

Solution to Problem

According to a first aspect, the present invention provides a statistical acoustic model adaptation method for a specific condition (such as speech data of a specific speaker or speech data under specific noise). The acoustic model uses DNN. The DNN includes a plurality of layers of three or more. This method includes the steps of: a computer readable first storage device separately storing speech data under a plurality of conditions; a computer preparing a plurality of hidden layer modules for respective conditions corresponding to the plurality of conditions; the computer, while switching and selecting speech data under the plurality of conditions, performing preliminary learning of all layers of the DNN while dynamically replacing a specific one of the plurality of layers with a hidden layer module corresponding to the selected speech data; the computer replacing the specific layer of the DNN that has completed the learning at the step of performing preliminary learning with an initial hidden layer prepared in advance; a second computer readable storage device storing speech data under a condition as an object of adaptation; and reading the speech data under the condition of the object of adaptation from the second storage device while fixing parameters of layers other than the initial hidden layer of the DNN produced at the step of replacing, and training the DNN.

Preferably, the adaptation method further includes the steps of: prior to the step of learning, the computer executing condition-independent training of the DNN with a huge amount of speech data not discriminated by any utterance condition; and storing, in a third storage device, parameters of the hidden layer of the specific layer of the DNN after training at the step of conducting condition-independent training. The step of replacing includes the step of the computer copying, to parameters of the specific layer of the DNN that has completed learning at the step of preliminary learning, the parameters of the hidden layer stored in the third storage device.

According to a second aspect, the present invention provides an acoustic model learning method suitable for statistical acoustic model adaptation under a specific condition. The acoustic model is an acoustic model using DNN. The DNN includes a plurality of layers of three or more. The learning method includes the steps of: a computer readable first storage device separately storing speech data under a plurality of conditions; a computer preparing a plurality of hidden layer modules for respective conditions corresponding to the plurality of conditions; the computer, while switching and selecting speech data under the plurality of conditions, performing preliminary learning of all layers of the DNN while dynamically replacing a specific one of the plurality of layers with a hidden layer module corresponding to the selected speech data; and the computer storing, in a storage medium, parameters of layers other than the specific layer of the DNN that has completed learning at the step of preliminary learning.

Preferably, the learning method further includes the steps of: the computer executing condition-independent training of the DNN with a huge amount of speech data not discriminated by any utterance condition; and storing parameters of the hidden layer of the specific layer of the DNN after training at the step of conducting condition-independent training additionally to the storage medium.

According to a third aspect, the present invention provides a storage medium storing parameters for building a DNN for an acoustic model learning, suitable for statistical acoustic model adaptation for speech recognition under a specific condition. The parameters stored in the storage medium are for building a DNN including a plurality of layers of three or more. The storage medium further stores a program for training, by fixing parameters of layers other than a specific layer of the DNN built by using the parameters stored in the storage medium, the DNN with speech data, whereby training only the specific layer of the DNN. The specific layer is predetermined corresponding to the DNN stored in the storage medium.

According to a fourth aspect, the present invention provides a computer program for adapting a statistical acoustic model for speech recognition under a specific condition. The acoustic model is an acoustic model using DNN. The DNN includes a plurality of layers of three or more. The computer program causes a computer to execute the steps of: separately storing, from a computer readable first storage device, speech data under a plurality of conditions; preparing a plurality of hidden layer modules for respective conditions corresponding to the plurality of conditions; while switching and selecting speech data under the plurality of conditions, performing preliminary learning of all layers of the DNN while dynamically replacing a specific one of the plurality of layers with a hidden layer module corresponding to the selected speech data; replacing the specific layer of the DNN that has completed the learning at the step of performing preliminary learning with an initial hidden layer prepared in advance; and storing the parameters of DNN obtained at the step of replacing in a storage medium.

BRIEF DESCRIPTION OF DRAWINGS

FIG. 1 is an illustration showing a method of applying a prior art to a DNN learning process for building a speaker-independent acoustic model.

FIG. 2 is an illustration showing a next step of the method of applying a prior art to a DNN learning process for building a speaker-independent acoustic model.

FIG. 4 is an illustration showing a learning method of a hidden layer for speaker adaptation, in DNN learning in accordance with an embodiment of the present invention.

FIG. 5 is an illustration showing a learning method of a hidden layer for speaker adaptation, in DNN learning in accordance with an embodiment of the present invention.

FIG. 7 shows, in a form of a table, results of experiment in accordance with an embodiment of the present invention, in comparison with results of the prior art.

FIG. 8 is a flowchart representing a control structure of a program for DNN learning building an acoustic model suitable for speaker adaptation, in accordance with an embodiment of the present invention.

DESCRIPTION OF EMBODIMENTS

Figure 3:
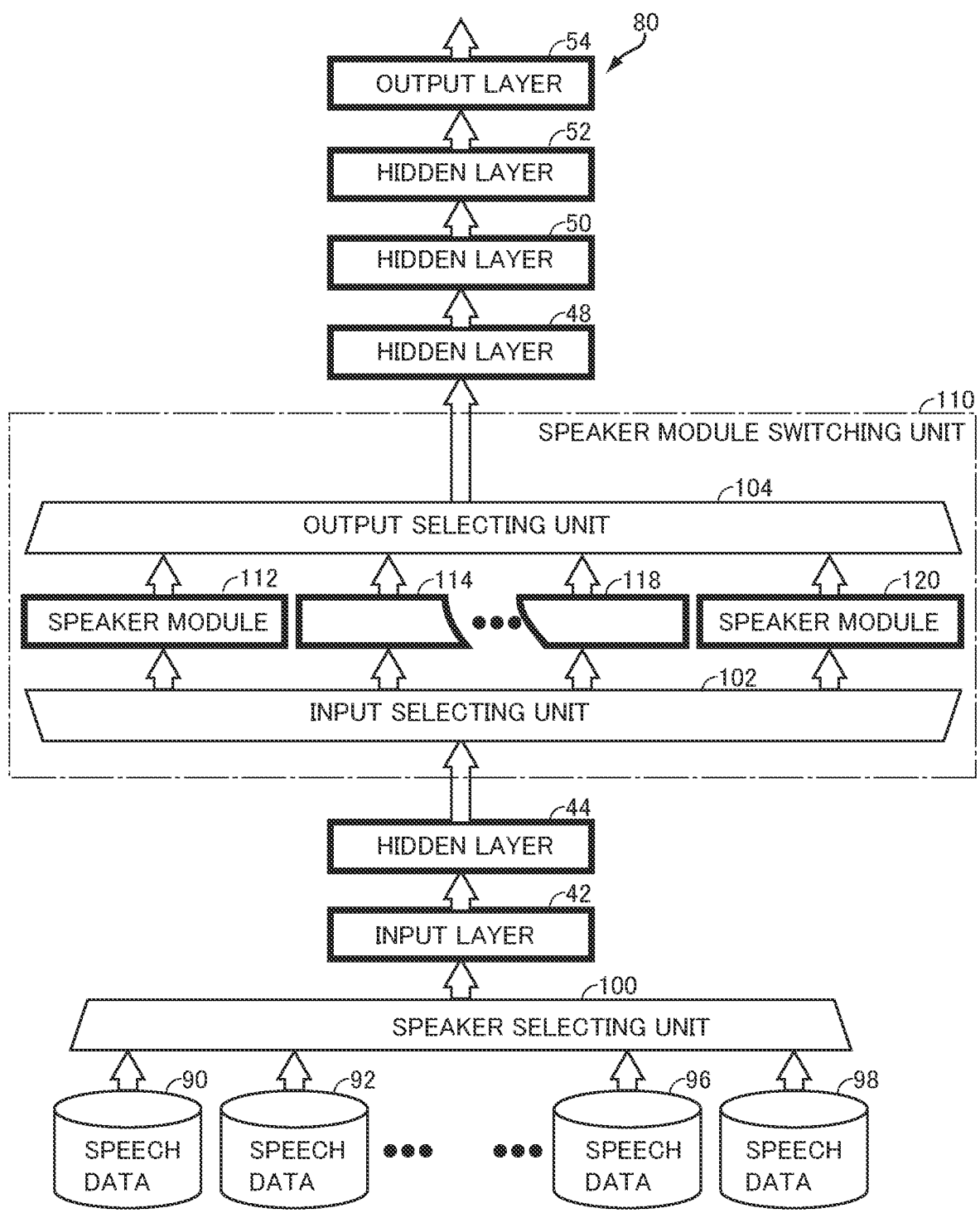
FIG. 3 is an illustration showing a method of preparing a DNN for building an acoustic model suitable for speaker adaptation, in DNN learning in accordance with an embodiment of the present invention.

In the following description and in the drawings, the same components are denoted by the same reference characters. Therefore, detailed description thereof will not be repeated. Though the embodiments below mainly relate to speech recognition related to adaptation under the condition of a specific speaker, the present invention is not limited to such an embodiment. For example, it is also applicable to adaptation under the condition of a noise environment.

[Configuration]

As described above, when speaker adaptation is to be done by an acoustic model using DNN, after the learning of DNN with speaker-independent speech data, a specific layer only is to be learned with speech data of a speaker who is the object of adaptation. At this time, parameters of other layers are fixed and not learned. For this purpose, however, the amount of speech data tends to be insufficient, and learning for adaptation takes undesirably long time. To solve such a problem, an acoustic model using DNN is speaker-adapted in a manner described in the following. It has been confirmed through experiments that by adopting this method, an acoustic model using DNN capable of efficiently realizing speaker adaptation for a specific speaker can be prepared.

In the present embodiment, for preparing a DNN for a speaker-independent acoustic model, as a premise, speaker adaptations using a specific layer (hereinafter referred to as a "speaker-adapting layer") are done beforehand. On this premise, parameters of layers other than the speaker-adapting layer are preliminary trained, so as to enable efficient speaker adaptation of the speaker-adapting layer later.

First, by the method shown in FIG. 1, a DNN 30 is subjected to speaker-independent learning using entire speech data. Generally, the DNN is initialized using the Restricted Boltzmann Machine (RBM). However, RBM is a non-discriminative training and not necessarily suitable for speech recognition or the like. Therefore, in the present embodiment, a method of discriminative training is adopted, in which RBM-pre-trained DNN is trained with Error Back Propagation (EBP) using the minimum Cross-Entropy (CE) loss criterion.

DNN 30 is basically a standard multi-layer perceptron network. A connection weight and a bias are added to each node of DNN 30. The following description assumes that DNN 30 has seven layers. Specifically, as already described in TECHNICAL PROBLEM section above, DNN 30 has an input layer 42, an output layer 54, and five hidden layers 44, 46, 48, 50 and 52 arranged between input layer 42 and output layer 54.

In DNN 30, connection weight between a t-th layer $L_t$ and a preceding, t-1-th layer $L_{t-1}$ is represented as a matrix of $W_t$. A weight matrix between the t-th layer $L_t$ and the layer $L_{t-1}$ of speaker-independent DNN 30 obtained by training with EBP described above will be denoted as "$W^{SI}_t$". HMM speech recognition method using a speaker-independent DNN such as DNN 30 will be referred to as SI DNN-HMM in the following. Here, "SI" represents Speaker Independent. The same applies throughout the description.

Referring to FIG. 3, in the present embodiment, after an SI DNN-HMM such as DNN 30 is obtained, a DNN 80 as an object of speaker adaptation is subjected to preliminary learning. For this preliminary learning, a huge amount of speech data 90, 92, . . . , 98 prepared speaker by speaker is used. DNN 80 is basically a standard multi-layer perceptron network. A connection weight and a bias are added to each node of DNN 80. Similar to DNN 30, DNN 80 has seven layers. Specifically, DNN 80 has an input layer 42, an output layer 54, a hidden layer 44, a speaker module switching unit 110, and hidden layers 48, 50 and 52, arranged between input layer 42 and output layer 54. An output of hidden layer 44 is connected to an input of speaker module switching unit 110. An output of speaker module switching unit 110 is connected to an input of hidden layer 48. Between speech data 90, 92, . . . , 98 and the input of input layer 42, a speaker selecting unit 100 is provided, for selectively taking out data of a specific speaker from speech data 90, 92, . . . , 98. Input layer 42, hidden layers 44, 48, 50 and 52 and output layer 54 can be obtained by copying parameters of corresponding layers of DNN 30.

Speaker module switching unit 110 includes: speaker modules 112, 114, . . . 118 and 120 forming hidden layers corresponding to respective speakers of speech data 90, 92, . . . , 98; an input selecting unit 102, responsive to selection of a speaker by speaker selecting unit 100, for coupling an input of that one of the speaker modules 112, 114, . . . , 118 and 120 which corresponds to the selected speaker, to the output of hidden layer 44; and an output selecting unit 104, responsive to selection of a speaker by speaker selecting unit 100, for coupling an output of that one of the speaker modules 112, 114, . . . , 118 and 120 which corresponds to the selected speaker, to the input of hidden layer 48. Each of the speaker modules 112, 114, . . . , 118 and 120 has the same configuration as hidden layer 44 or the like, and in the present embodiment, one obtained by copying $W^{SI}_2$ to respective weight matrix is used. Specifically, parameters of hidden layer 46 when learning of DNN 30 shown in FIG. 1 is completed are used.

By such a configuration, input layer 42, hidden layer 44, speaker module switching unit 110, hidden layers 48, 50 and 52 and output layer 54 can be trained using speech data of a plurality of speakers, with speaker modules 112, 114, . . . , 118 and 120 switched appropriately speaker by speaker, as will be described later. In the present embodiment, EPB learning is also used in this phase. Since the number of data bits representing speech data is typically limited, there is a risk of over-fitting. To circumvent the over-fitting problem, we imposed a limitation, which will be described later.

As described above, DNN 80 is trained using speech data of all speakers while switching the speaker modules 112, 114, . . . , 118 and 120 speaker by speaker, and thus, learning of input layer 42, hidden layer 44, hidden layers 48, 50 and 52 and output layer 54 is completed. In the present embodiment, this learning is referred to as preliminary learning. The aim of preliminary learning is not the training of speaker modules 112, 114, . . . , 118 and 120. It is to obtain input layer 42, hidden layer 44, hidden layers 48, 50 and 52 and output layer 54 that are learned to be suitable for speaker adaptation. As shown in FIG. 4, by replacing the speaker module switching unit 110 of DNN 80 obtained in this manner with a dummy hidden layer 140, a preliminary-trained DNN 130 is obtained. As will be described later, this DNN 130 is suitable for speaker adaptation for the hidden layer at the position of speaker module switching unit 110. Therefore, by storing parameters of DNN 130 in a storage medium and at the same time by storing a program that causes learning of only the hidden layer at the position of speaker module switching unit 110 (program executing the process shown in FIG. 2) in the same storage medium, the data suitable for speaker-adapting DNN 130 are ready in the storage medium. Here, the layer as the object of speaker adaptation is fixed to the hidden layer at the position of speaker module switching unit 110, and speaker adaptation of any other layer would be unsuccessful.

Referring to FIG. 4, a method of speaker adaptation of preliminary-trained DNN 130 will be described. In advance, data 150 for speaker adaptation is prepared. Data 150 for speaker adaptation includes speech data 162 of the speaker as the object of speaker adaptation, and a speaker-specific adapting module 160. Adapting module 160 has the same configuration as each of speaker modules 112, 114, . . . , 118 and 120, but it corresponds to an initial value of hidden layer before speaker adaptation. In the present embodiment, hidden layer 46 at the same position as speaker module switching unit 110 of DNN 30 trained by the method shown in FIGS. 1 and 2 is used as adapting module 160. The weight matrix $W^{mean}_2$ of hidden layer 46 after initial learning is copied to the weight matrix of adapting module 160. Here, "mean" means that data of all speakers have been used for the learning.

As a preparation of speaker adaptation, adapting module 160 is copied to dummy hidden layer 140 of DNN 130 (the weight matrix of adapting module 160 is copied to the weight matrix of dummy hidden layer 140), and thereby a new DNN 180 is obtained as shown in FIG. 5. DNN 180 before speaker adaptation obtained in this manner will be referred to as PT-SAT (pre-Trained SAT) network in the following.

As shown in FIG. 5, of DNN 180, parameters of input layer 42, hidden layers 44, 48, 50 and 52 and output layer 54 are fixed, and only the speaker-specific adapting module 160 is trained with speech data 162. As in the preliminary learning, training is EBP training using minimum CE loss criterion for regularizing speech data. The DNN 180 resulting at the end of learning will be the DNN for the speaker-adapted acoustic model adapted with speech data 162.

Referring to the limitation imposed, here, regularized EBP training is used in place of standard training. There are several possible methods (definitions) of regularization. In the present embodiment, we use the $L_2$ norm of the difference between the weight matrix $W^{SI}_{tSD}$ as the initial value for producing a network such as shown in FIG. 3 and the weight matrix $W^{mean}_{tSD}$ as the initial value for producing a network such as shown in FIG. 4, and the weight matrix of speaker module. In this training, though the number of training data for the speaker module and the adapting module is limited, a sufficiently large amount of data is available for training other layers. Therefore, the regularization term is introduced only to the speaker module and the adapting module.

The regularization term for SAT speech recognition learning is defined by the following equation (1).

$$R(\Lambda) = \frac{1}{2} \| W_{tSD} - W^{mean}_{sTD} \|_2^2 + \frac{1}{2} \| b_{tSD} - b^{mean}_{tSD} \|_2^2 \qquad (1)$$

where $W_{tSD}$ and $b_{tSD}$ are the weight matrix of the speaker module of the $t_{SD}$-th layer and the corresponding bias vector, and $W^{mean}_{tSD}$ and $b^{mean}_{tSD}$ are initial values of weight matrix and bias vector immediately before speaker adaptation (after speaker-independent learning).

For producing the network shown in FIG. 3, $W^{mean}_{tSD}$ and $b^{mean}_{tSD}$ in equation (1) are replaced with the weight matrix and its corresponding bias vector of $t_{SD}$-th SI DNN, respectively.

When DNN 80 is subjected to preliminary learning while switching speakers in the scheme shown in FIG. 3, if speech data is switched in turn, for example, if training with speech data of a certain speaker starts only after training with speech data of another speaker is fully completed, the influence of latter speech data tends to remain in each layer of DNN 80 than the influence of preceding speech data. To avoid this undesirable tendency, the preliminary learning is preferably conducted in the following manner.

Figure 6:
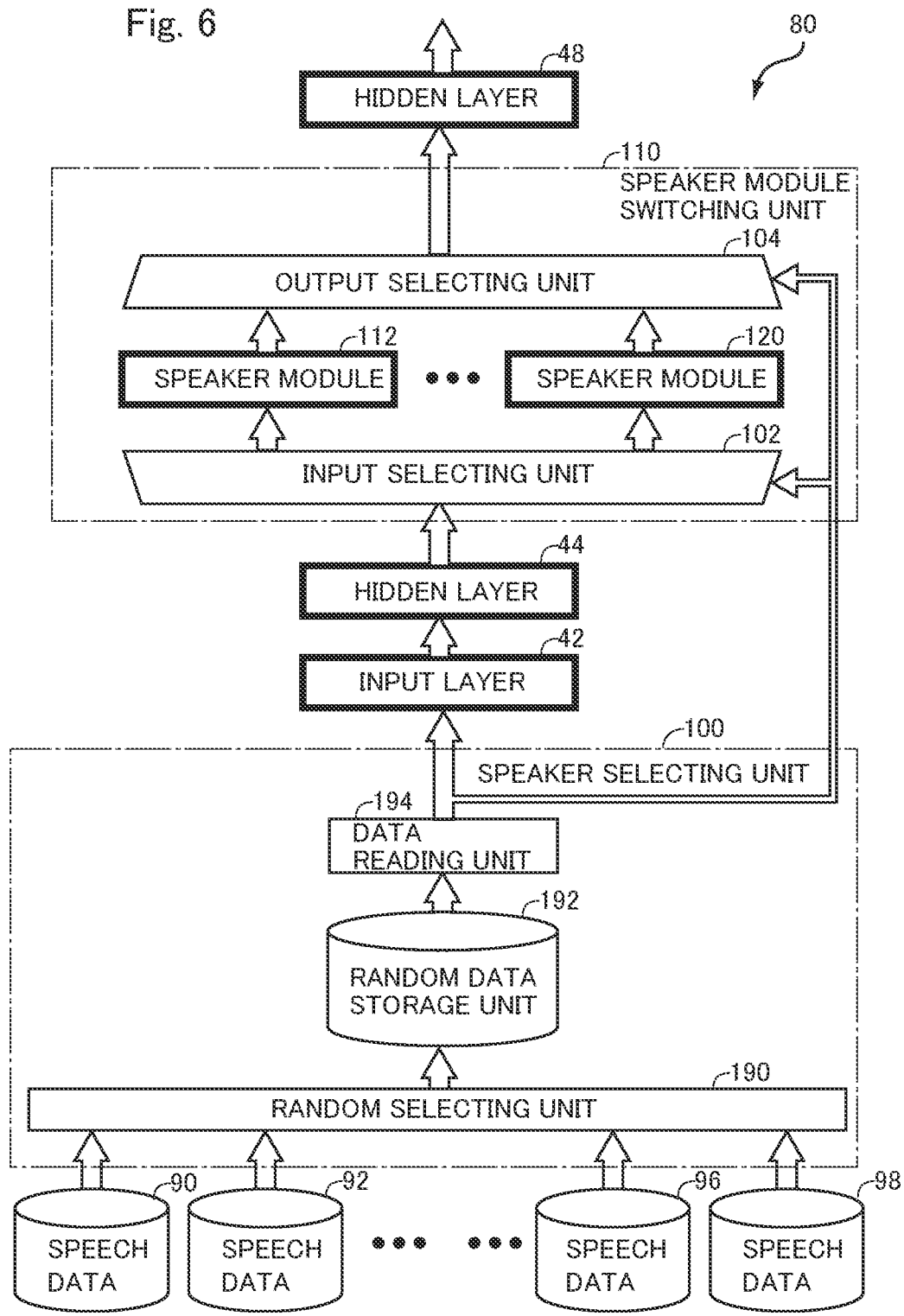
FIG. 6 is an illustration showing a configuration of a device for realizing the process shown in FIG. 3.

Referring to FIG. 6, speaker selecting unit 100 includes: a random selection unit 190, dividing speech data 90, 92, . . . , 98 to small pieces, adding a piece of information (speaker identifying information) for identifying the corresponding speaker to each piece, selecting these pieces in a random order and coupling these to one file; a random data storage unit 192 for storing the file output from random selecting unit 190; and a data reading unit 194 reading, from the first piece, the contents of the file stored in random data storage unit 192 and outputting these to input selecting unit 102 and output selecting unit 104 of speaker module switching unit 110. The output of data reading unit 194 is connected to the input of input layer 42 so that the read data is also given to input layer 42.

Input selecting unit 102 is realized by a selector that selects an appropriate module corresponding to the speaker from speaker modules 112, 114, . . . , 118 and 120 in accordance with the speaker identifying information from data reading unit 194 and connects the output of hidden layer 44 to the input thereof. Similarly, output selecting unit 104 is realized by a selector that selects an appropriate module corresponding to the speaker from speaker modules 112, 114, . . . , 118 and 120 and connects the output thereof to the input of hidden layer 48. In the present embodiment, there are five hidden layers, and speaker module switching unit 110 is arranged at the position of the second hidden layer. Therefore, between the input layer 42 and the input selecting unit 102, only the hidden layer 44 exists. The position of speaker module switching unit 110 can be changed, and the number of hidden layers is not limited to five. If the speaker module switching unit 110 is arranged at the position of the third hidden layer, there are two hidden layers between input layer 42 and input selecting unit 102.

By this scheme, it becomes possible to train DNN 80 in an order not biased to a certain speaker at one time while randomly selecting speech data of respective speakers. As a result, preliminary learning of DNN 80 is possible while minimizing the influence of the order of selection of speech data.

[Operation]

The DNN speaker adaptation device having the above-described configuration operates in the following manner.

Speech data 90, 92, ..., 98 of a plurality of speakers, and hidden layer 46 of speaker-independent DNN trained in the manner shown in FIG. 1 are prepared beforehand.

Referring to FIG. 6, before preliminary learning, the speaker adapting device operates in the following manner. Random selecting unit 190 divides speech data 90, 92, ..., 98 to small pieces, and adds a piece of speaker identifying information to each piece. Further, random selecting unit 190 rearranges the large number of pieces of speech data prepared in this manner in a random order, and writes them as a file, to random data storage unit 192.

When the preliminary learning starts, data reading unit 194 shown in FIG. 6 reads pieces of speech data one by one starting from the head of data storage unit 192, and applies the speaker identifying information to input selecting unit 102 and output selecting unit 104. In accordance with the piece of speaker identifying information, input selecting unit 102 selects the module corresponding to the piece of speaker identifying information from speaker modules 112, 114 ..., 118 and 120, and connects the output of hidden layer 44 to the input of the selected hidden layer. Similarly, output selecting unit 104 selects the module corresponding to the piece of speaker identifying information from speaker modules 112, 114 ..., 118 and 120, and connects the output thereof to the input of hidden layer 48. After the connection of DNN 80 is established in this manner, all layers of DNN 80 are trained using the data read by data reading unit 194 from random data storage unit 192.

Once learning with a piece read by data reading unit 194 ends, data reading unit 194 reads the next piece from random data storage unit 192, and the process described above is executed again, using the read piece.

When this process is completed for every piece in the file stored in random data storage unit 192, the preliminary learning of DNN 80 ends. By replacing speaker module switching unit 110 of DNN 80 with dummy hidden layer 140, DNN 130 shown in FIG. 4 is obtained.

Generally, DNN 130 prepared in this manner and an adapting module 160 produced by copying the parameters of hidden layer 46 from DNN 30 (shown in FIG. 1) trained as a speaker-independent DNN beforehand form a set. These and the conventional learning program shown in FIG. 2 are combined and distributed as a product. If the program such as shown in FIG. 2 is readily available, the set may be distributed without the program. In that case, the layer as the object of adaptation is fixed as described above, and any other layer would be meaningless if selected as an object of adaptation.

A user, wishing to build an acoustic model with speaker-adapted DNN, obtains the DNN 130 having completed the preliminary learning, the adapting module 160 as an initial value, and the program for training such as shown in FIG. 2. Thereafter, the user replaces the dummy hidden layer 140 of DNN 130 with adapting module 160. Specifically, the weight matrix of adapting module 160 is copied to the weight matrix of dummy hidden layer 140. Further, speech data 162 of the specific speaker as the object of speaker adaptation is prepared, and the device is set such that the speech data 162 is applied to the input of DNN 130.

In this state, as shown in FIG. 5, parameters of input layer 42, hidden layers 44, 48, 50 and 52 and output layer 54 are fixed, and speech data is read one by one and only the adapting module 160 is trained using the speech data as training data. Resulting learned DNN 180 is adapted for the speaker of speech data 162, and thus, the acoustic model using DNN 180 will be an acoustic model adapted for the speaker.

[Experiments]

The system in accordance with the present embodiment was subjected to accuracy evaluation experiment, using lecture speech corpus of TED on the web. For the experiment, we prepared three data sets; training, evaluation and testing.

The training data consisted of the speech data of 300 speakers. Each speaker's data was about 30 minutes. The total length of training data was about 150 hours.

The evaluation data consisted of the speech data of eight speakers. The speakers of evaluation data were not the speakers of training data. The evaluation data was used for finding the optimal values (that produced high recognition accuracies over the evaluation data itself) of the hyper parameters (such as learning rate of CE minimization and regularization coefficient).

The test data consisted of 28 speakers. The data is used as test data set of IWSLT 2013. The speakers were different from the speakers of training data or the speakers of evaluation data.

For the experiment, the speech recognizer using the DNN described above was realized, replacing the GMM of each state of HMM in a conventional speech recognizer using HMM. This is referred to as SAT-DNN-HMM. To evaluate the SAT-DNN-HMM, a baseline HMM speech recognizer using speaker-independent DNN, and an HMM speech recognizer using the DNN speaker-adapted by the method shown in FIG. 2 were prepared. The former will be referred to as SI-DNN, and the latter will be referred to as SA-DNN. "SI" stands for "Speaker-Independent" and "SA" stands for "Speaker-Adapted."

The SI-DNN adopted a simple seven-layer DNN, and the whole network was first initialized by RBM training and thereafter trained using CE minimization over the training data.

The SA-DNN was implemented by adapting a hidden layer of the SI-DNN using speech data of one speaker selected from the 28 speakers of test data. The hidden layer was the same layer as the speaker-adapted hidden layer of SAT-DNN. To circumvent the problem of closed-form training, we divided the speech data of every speaker as the object of speaker adaptation to four sub-groups and obtained recognition results in the four-times cross-validation (CV) scheme. In this CV scheme, one of the sub-groups was used for testing and the remaining three sub-groups were used for training and the recognition accuracy was obtained. Then, the process was repeated four times with the sub-group for testing switched, and the final recognition accuracy was the average recognition accuracy.

For the SAT-DNN, as described above, the initial value of hidden layer for speaker adaptation was prepared by the same training as conducted on SI-DNN. Next, speaker modules, whose numbers were the same as those of the training data speakers (300) were prepared. Next, by the configurations shown in FIGS. 3 and 6, the DNN was preliminary learned using the speaker modules. Thereafter, by the configuration shown in FIGS. 4 and 5, speaker adaptation was conducted, for one speaker selected from the 28 test speakers.

In speaker adaptation of SAT-DNN, over-fitting must be avoided, since training data is limited. Therefore, we applied the regularization term of equation (1) to update the weight and bias of hidden layer 140, changing $W^{mean}_{lsd}$ and $b^{mean}_{lsd}$ to $W^{SI}_{lsd}$ and $b^{SI}_{lsd}$, respectively.

The speech data was first converted to a series of acoustic feature vectors. Each vector was calculated through a 20-ms Hamming window that was shifted at 10-ms intervals. The acoustic feature vectors have 39 dimensions, consisting of 12 MFCCs (Mel-scale Frequency Cepstrum Coefficient), logarithmic (log) power, 12 ΔMFCCs, log-power, 12 ΔMFCCs and 44 log-power.

Further, 11 concatenated acoustic feature vectors (429 dimensions) were used as inputs for the DNN. From the viewpoint of the Hamming window positioning, these vectors of 429 dimensions were considered a concatenation of 11 acoustic feature vectors, five immediately preceding the Hamming window, one in the Hamming window and five immediately following the Hamming window. Each element of the vectors was normalized so that its mean and variance become 0 and 1, respectively.

In the speech recognizers, the HMM used the 4-gram language model. The language model was trained over the transcriptions of TED talks, News Commentary and English Gigaword (H. Yamamoto, Y. Wu, C. L Huang, X. Lu, P. R. Dixon, S. Matsuda, C. Hori, and H. Kashioka, "The NICT ASR System for IWSLT2012," in Proceedings of IWSLT2012, 2012.). As the acoustic model, a context-dependent acoustic model trained with Boosted MMI (Maximum Mutual Information) was used. During the DNN training, all the HMM parameters such as the language model and the state transition probabilities were fixed.

The DNN used for speech recognition had 429 input nodes, 4909 output nodes, and 512 nodes for each hidden layer. There were seven layers, and one of the five hidden layers was used for speaker adaptation both in SA-DNN and SAT-DNN. The layer selection effect in the speaker adaptation was studied by changing the selected layer from the first to last hidden layer.

DNN training sometimes requires careful control of the learning rate. Therefore, in each step of repetition of learning, the learning rate was controlled as in the following based on recognition accuracies over the evaluation data.

If recognition error decreased over the evaluation data, the learning rate was kept the same as in the previous repetition step (epoch). Otherwise, the learning rate was updated to half the last step, and the network parameters (weights and the like) were replaced with those produced the minimum error rate in the preceding training epoch, and the training for these replaced parameters was restarted using the updated learning rate.

The training of SI-DNN speech recognizer and PT-SAT-DNN speech recognizer was started by setting the initial value of the learning rate to 0.004 and repeated 20 times (corresponding to 20 epochs), using the above-described learning rate updating rules. Similarly, for the training of DNN shown in FIGS. 3 and 6, the initial value of the learning rate was 0.004, the number of epochs was 20 and the regularization coefficient was set to 0.1.

In contrast, in the speaker adaptation step shown in FIG. 5, the learning rate was fixed to the value determined based on the recognition accuracy over the evaluation data. The learning rate for speaker adaptation for the SA-DNN speech recognizer was set to 0.005, and the learning rate for speaker adaptation for the SAT-DNN speech recognizer was set to 0.001. The speaker adaptation procedures were repeated ten times with the regularization coefficient of 0.1. The regularization coefficient was also determined based on the recognition accuracy over the evaluation data.

[Results]

Results are as shown in FIG. 7. FIG. 7 shows the recognition performance of four speech recognizers in word error rate. The error rates of SA-DNN and SAT-DNN are the average value obtained by the above-described CV scheme. In the table of FIG. 7, the left-end column indicates the number of hidden layers selected as the object of speaker adaptation. Specifically, "1" corresponds to the hidden layer 44 of FIG. 1, "2" to hidden layer 46 and similarly, "5" corresponds to hidden layer 52. Since SI-DNN did not have a speaker adapting layer, the same error rate value (26.4%) was shown in all corresponding columns.

As can be seen from FIG. 7, the SAT-DNN speech recognizer achieved the lowest word error rate (18%). This value is an 8.4 reduction from that of the baseline SI-DNN. The results of SA-DNN show that even the simple speaker adaptation to SI-DNN produced lower word error rate of 18.7 to 20.0%. These are 6.4 to 7.7 points lower than the values attained by SI-DNN. Comparing the results of SAT-DNN with those of SA-DNN, however, clearly demonstrates the better results of SAT-DNN. Regardless of the layer that was selected as the object of speaker adaptation, the results were better than the values attained by SA-DNN using the same layer as the object of speaker adaptation.

The results of PT-SAT-DNN show slightly higher word error rates than SI-DNN. Therefore, it cannot be used by itself. Considering the fact that the SAT-DNN, having a specific layer of PT-SAT-DNN speaker-adapted, achieved the satisfactory results above, PT-SAT-DNN can be regarded as an effective starting point to obtain SAT-DNN. In view of the fact that speaker adaptation is mainly conducted in a user environment, a vender of speech recognizers or a software vender may prepare a PT-SAT-DNN, and may provide a product having an initial module of a specific hidden layer as an object of speaker adaptation and software for training only the initial module of the PT-SAT-DNN having the initial module incorporated in a specific hidden layer stored as a set in a storage medium. This realizes a speech recognizer having high performance allowing efficient speaker adaptation on the side of the user.

The table of FIG. 7 also shows that when the third hidden layer was used as the object of speaker adaptation, the lowest word error rate was achieved both in SA-DNN and SAT-DNN. Though not directly concluded, the effect of speaker adaptation seems to become higher when the layer as the object of speaker adaptation is close to the central one of the hidden layers. These results suggest that DNN extracts some acoustic feature necessary for speech recognition from input at portions closer to the input layer and feeds the same to upper layers, that nodes processing speaker-dependent feature information are concentrated in the hidden layer or layers near the center when speaker adaptation is suitably controlled, and that speaker-independent linguistic process mainly takes place at portions close to the output device.

Taking into consideration the experimental results above, the method of speaker adaptation in speech recognition by SAT-DNN can effectively be applied to recognition using DNN under specific conditions, such as speech recognition under a specific noise condition, communication channel adaptation in specific communication path and the like.

[Computer Implementation]

The DNN learning device described above can be implemented by computer hardware and a computer program cooperating with the computer hardware. As to the programs realizing the SI DNN learning and the speaker adaptation of DNN shown in FIG. 5, those for executing the processes shown in FIGS. 1 and 2 can be used. In the following, a control structure of a program realizing the configuration shown in FIG. 6 will be described.

Referring to FIG. 8, the program includes: a step 220 of performing, when activated, an initialization process such as initialization of memory locations and opening speech data 90, 92, . . . , 98 and opening an output file in random data storage unit 192; a step 222 of dividing speech data 90, 92, . . . , 98 to divided data consisting of small pieces and adding to each divided data a piece of corresponding speaker information; a step 224 of coupling the divided data in a random order and writing the result as a file in random data storage unit 192; and a step 226 of reading the divided data one by one from the file written in random data storage unit 192 and performing the process below for each data.

Step 226 includes: a step 228 of selecting, in accordance with the piece of speaker identifying information included in the read divided data, that one of the speaker modules 112, 114, . . . , 118 and 120 which corresponds to the speaker identifying information; and a step 230 of executing the training process on all layers of the formed DNN 80.

By executing the process of step 226 on every divided data, the preliminary learning of DNN 80 is completed. The program closes all of the open files at step 220, and releases all allocated memory locations, and thereby ends execution. Thereafter, by replacing the speaker module switching unit 110 of DNN 80 with dummy hidden layer 140, DNN 130, which has completed the preliminary learning, is obtained.

[Hardware Configuration]

Figure 9:
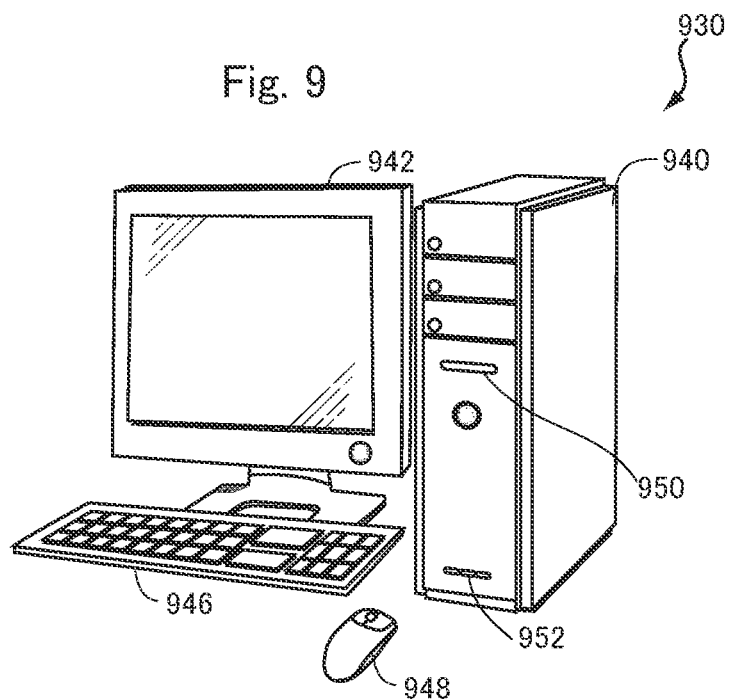
FIG. 9 shows an appearance of a computer system executing the DNN learning process in accordance with an embodiment.
Figure 10:
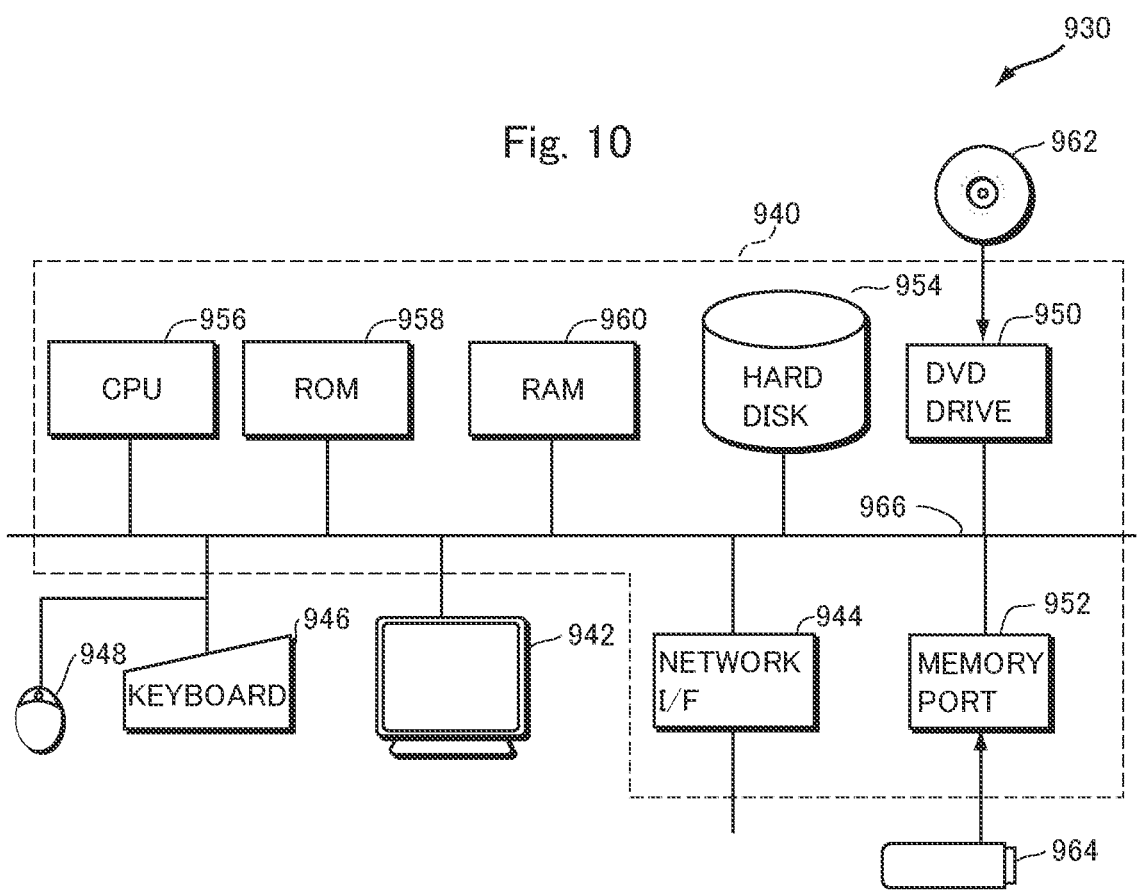
FIG. 10 is a block diagram showing an internal configuration of the computer shown in FIG. 9.

FIG. 9 shows an appearance of a computer system 930 executing the computer program realizing the DNN learning and speaker adaptation described above. FIG. 10 shows an internal configuration of computer system 930.

Referring to FIG. 9, computer system 930 includes a computer 940 including a memory port 952 and a DVD (Digital Versatile Disc) drive 950, a keyboard 946, a mouse 948, and a monitor 942.

Referring to FIG. 10, in addition to memory port 952 and DVD drive 950, computer 940 includes: a CPU (Central Processing Unit) 956; a bus 966 connected to CPU 956, memory port 952 and DVD drive 950; a read only memory (ROM) 958 storing a boot-up program and the like; and a random access memory (RAM) 960, connected to bus 966, for storing program instructions, a system program, work data and the like. Computer system 930 further includes a network interface (I/F) 944 providing network connection to enable communication with other terminals.

The computer program causing computer system 930 to function as various functional units of the system in accordance with embodiment above is stored in a DVD 962 or a removable memory 964, which is loaded to DVD drive 950 or memory port 952, and transferred to a hard disk 954. Alternatively, the program may be transmitted to computer 940 through a network, not shown, and stored in hard disk 954. At the time of execution, the program is loaded to RAM 960. The program may be directly loaded to RAM 960 from DVD 962, from removable memory 964, or through the network.

The program includes a sequence of instructions consisting of a plurality of instructions causing computer 940 to function as various functional units of the system in accordance with the embodiment above. Some of the basic functions necessary to carry out such operations may be dynamically provided at the time of execution by the operating system running on computer 940, by a third-party program, or various programming tool kits or program library installed in computer 940. Therefore, the program itself may not include all functions to realize the system and method of the present embodiment. The program may include only the instructions that call appropriate functions or appropriate program tools in the programming tool kits dynamically from a storage device in the computer in a controlled manner to attain a desired result and thereby to realize the functions of the system described above. Naturally the program itself may provide all necessary functions.

In the embodiment shown in FIGS. 3 to 10, the training data and parameters of various networks are stored in RAM 960 or hard disk 954. The network parameters may be stored in a removable memory 964 such as a USB memory, or in a DVD 962, or may be transmitted to another computer through a communication medium such as a network.

The operation of computer system 930 executing the computer program is well known. Therefore, details thereof will not be repeated here.

[Modifications]

The embodiment described above is directed to the speaker adaptation in speech recognition. It is noted, however, that the present invention is applicable not only to the speaker adaptation. By way of example, it is also similarly applicable to speech recognition under a specific noise environment. In that case, any of the layers of DNN is determined beforehand to be adapted to the noise environment. Speeches under various noise environments are collected, and prepared as separate training data for different types of noise environments. Further, noise modules are prepared for respective noise environments, which noise modules are switchable at the specific layer of DNN. DNN is trained using the training data of different noise environments, with the noise modules switched in accordance with the type of noise environment of the training data, in the similar manner as the speech data used in the embodiment above. When this training is completed, the preliminary learning of DNN is completed.

In the adaptation process, the speech data under the noise environment as the object of adaptation is prepared as training data. An initial module prepared in some way or other is set on the specific layer of DNN that has completed the preliminary learning. Parameters of layers other than the specific layer are fixed and the DNN is trained using the training data. The DNN resulting from the training is suitably applicable to HMM for speech recognition under the noise environment as the object of adaptation.

Further, in the embodiment above, only one speaker module was used as the object of adaptation. The present invention, however, is not limited to such an environment. Theoretically, the number of modules to be the object of adaptation may be two or more. It is unnecessary to arrange these modules in continuous layers. Further, the position of the module to be the object of adaptation is not limited to a hidden layer. The present invention is applicable to adaptation of the input layer or the output layer.

Further, the embodiment above is related to an acoustic model calculating state output probability of HMM using DNN. The method of DNN adaptation in accordance with the present invention is not limited thereto. By way of example, the present invention is applicable to speaker adaptation as in the embodiment above, when acoustic analysis is done using DNN and conventional GMM-HMM training is done using the result of analysis.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention is applicable to a device and service assisting language based man-to-man or man-machine communication. Particularly, the present invention is applicable to a device and service for assisting communication enabling improved recognition accuracy under specific conditions, including speech recognition of a specific speaker, speech recognition under a specific noise environment, or adaptation of a communication channel over a specific communication path.

REFERENCE SIGNS LIST 30, 80, 130, 180 DNN
40, 60, 90, 92, 96, 98, 162 speech data
42 input layer
44, 46, 48, 50, 52 hidden layer
54 output layer
100 speaker selecting unit
102 input selecting unit
104 output selecting unit
110 speaker module switching unit
112, 114, 118, 120 speaker module
140 dummy hidden layer
150 data for speaker adaptation
160 adapting module
190 random selecting unit
192 random data storage unit
194 data reading unit

The invention claimed is:

1. A statistical acoustic model adaptation method for speech recognition under a specific condition, wherein
said acoustic model is an acoustic model using Deep Neural Network (DNN), said DNN including three or more layers comprising an input layer, an output layer, and one or more hidden layers;
said method comprising the steps of:
accessing separately stored speech data under a plurality of conditions from a computer readable first storage device;
a computer generating a plurality of insertable hidden layers, wherein each of the plurality of insertable hidden layers is associated with a respective condition of said plurality of conditions;
using the computer to perform preliminary learning of all layers of said DNN to obtain layers suitable for adapting to different conditions, the preliminary learning comprising:
for each of the separately stored speech data under said plurality of conditions:
replacing a specific layer of said one or more hidden layers with an insertable hidden layer of the plurality of insertable hidden layers that is respectively associated with said plurality of conditions; and
training said DNN including the insertable hidden layer using said stored speech data under the respective condition that the insertable hidden layer is associated with;
using the computer, replacing said specific layer with an initial hidden layer;
accessing from a second computer readable storage device stored speech information having a condition that is an object of adaptation;
fixing parameters of layers other than said initial hidden layer of said DNN, such that the fixed parameters do not change during training of said DNN; and
training said DNN using the speech information.

2. The method according to claim 1, further comprising the steps of:
prior to said step of learning, the computer executing condition-independent training of said DNN with speech data including multiple utterance conditions; and
storing, in a third storage device, parameters of the hidden layer of said specific layer of said DNN after training at said step of conducting condition-independent training;
wherein said step of replacing includes the step of the computer copying, to parameters of said specific layer of said DNN that has completed learning at said step of preliminary learning, the parameters of the hidden layer stored in said third storage device.

3. An acoustic model learning method suitable for statistical acoustic model adaptation under a specific condition, wherein
said acoustic model is an acoustic model using Deep Neural Network (DNN), said DNN including three or more layers comprising an input layer, an output layer, and one or more hidden layers;
said method comprising the steps of:
accessing separately stored speech data under a plurality of conditions from a computer readable first storage device;
a computer generating a plurality of insertable hidden layers, wherein each of the plurality of insertable hidden layers is associated with a respective condition of said plurality of conditions;
using the computer to perform preliminary learning of all layers of said DNN to obtain layers suitable for adapting to different conditions, the preliminary learning comprising:
for each of the separately stored speech data under said plurality of conditions:
replacing a specific layer of said one or more hidden layers with an insertable hidden layer of the plurality of insertable hidden layers that is respectively associated with said plurality of conditions; and
training said DNN including the insertable hidden layer using said stored speech data under the respective condition that the insertable hidden layer is associated with;
the computer storing, in a storage medium, parameters of the layers of the DNN other than said specific layer of said DNN that have completed training at said step of preliminary learning.

4. The method according to claim 3, further comprising the steps of:
the computer executing condition-independent training of said DNN with speech data including multiple utterance conditions; and
storing parameters of the hidden layer of said specific layer of said DNN after training at said step of conducting condition-independent training additionally to said storage medium.

5. A computer program stored on a non-transitory computer readable medium for adapting a statistical acoustic model for speech recognition under a specific condition, wherein
said acoustic model is an acoustic model using Deep Neural Network (DNN), said DNN including three or more layers comprising an input layer, an output layer, and one or more hidden layers;
said computer program causing a computer to execute the steps of:
separately storing, from a computer readable first storage device, speech data under a plurality of conditions;
generating a plurality of insertable hidden layers, wherein each of the plurality of insertable hidden layers is associated with a respective condition of said plurality of conditions;
perform preliminary learning of all layers of said DNN to obtain layers suitable for adapting to different conditions, the preliminary learning comprising:
for each of the separately stored speech data under said plurality of conditions:
replacing a specific layer of said one or more hidden layers with an insertable hidden layer of the plurality of insertable hidden layers that is respectively associated with said plurality of conditions; and
training said DNN including the insertable hidden layer using said stored speech data under the respective condition that the insertable hidden layer is associated with;
replacing said specific layer with an initial hidden layer; and
storing in a storage medium the parameters of the DNN obtained at said step of replacing.

* * * * *